United States Patent
Kumagai et al.

(10) Patent No.: US 7,253,578 B2
(45) Date of Patent: Aug. 7, 2007

(54) PIVOTING APPARATUS OF INDUSTRIAL ROBOT

(75) Inventors: Yoshitaka Kumagai, Tokyo (JP); Tomoyuki Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/606,982

(22) Filed: Dec. 1, 2006

(65) Prior Publication Data

US 2007/0138991 A1 Jun. 21, 2007

Related U.S. Application Data

(62) Division of application No. 10/545,951, filed as application No. PCT/JP2003/002579 on Mar. 5, 2003.

(51) Int. Cl.
*B25J 9/18* (2006.01)

(52) U.S. Cl. .............. 318/568.11; 318/568.12; 318/568.18; 901/1; 901/8

(58) Field of Classification Search .................. None
See application file for complete search history.

(56) References Cited

U.S. PATENT DOCUMENTS

| | | | |
|---|---|---|---|
| 4,608,651 A * | 8/1986 | Murakami et al. ......... 700/250 |
| 4,678,952 A * | 7/1987 | Peterson et al. ............ 310/83 |
| 4,713,593 A * | 12/1987 | Rodi et al. ................ 318/572 |
| 5,123,079 A * | 6/1992 | Tanii et al. ................ 388/827 |
| 5,132,601 A * | 7/1992 | Ohtani .................... 318/568.1 |
| 5,293,107 A * | 3/1994 | Akeel .................... 318/568.11 |
| 5,525,027 A * | 6/1996 | Jinno et al. ................ 414/680 |
| 5,820,623 A * | 10/1998 | Ng ............................ 606/1 |
| 6,007,550 A * | 12/1999 | Wang et al. ................ 606/139 |
| 6,337,547 B1 * | 1/2002 | Jouan de Kervenoael .... 318/15 |
| 6,804,579 B1 * | 10/2004 | Laski ........................ 700/245 |
| 7,042,184 B2 * | 5/2006 | Oleynikov et al. ..... 318/568.12 |
| 2005/0189333 A1 * | 9/2005 | Nakagiri et al. ......... 219/125.1 |

* cited by examiner

*Primary Examiner*—Lincoln Donovan
*Assistant Examiner*—Renata McCloud
(74) *Attorney, Agent, or Firm*—Sughrue Mion, PLLC

(57) ABSTRACT

There is provided a pivoting apparatus of an industrial robot including: a brake 40 that is fixed to a motor shaft 30s of a motor 30 to halt the motor 30; an encoder 50 that is fixed to the motor shaft 30s to detect the pivoting angle of the motor 30; a speed reducer 60 that is coupled with the motor shaft 30s to form a communicating hollow portion, that is fixed to and coupled with a pivoting-side arm 20, and that reduces the rotation speed of the motor 30; a pipe-supporting bearing 72 that is provided in a fixed-side arm 10 and that is communicated with the communicating hollow portion; and a low-speed pivoting pipe 70 whose one end is fixed to and coupled with the pivoting-side arm 20 and the other end of which is fixed to the pipe-supporting bearing 72, and through which a cable 80 is wired.

2 Claims, 3 Drawing Sheets

PIVOTING APPARATUS OF INDUSTRIAL ROBOT

This is a Divisional application of pending prior application Ser. No. 10/545,951 filed Aug. 17, 2005, which is a 371 of PCT/JP2003/002579 filed Mar. 5, 2003. The entire disclosure of the prior applications is hereby incorporated by reference.

BACKGROUND OF THE INVENTION

1. Field of the Invention

The present invention relates to the pivoting apparatus of an industrial robot, and more particularly to wiring and processing cables in a pipe member that is inserted with play into a hollow provided through a speed reducer, a motor, and an encoder.

2. Description of the Related Art

A conventional pivoting apparatus of a conventional industrial robot will be explained referring to Japanese Laid-Open Publication No. 1993-57664. According to Japanese Laid-Open Publication No. 1993-57664, a pivoting apparatus includes a fixed base of a robot, a pivoting body being pivotably coupled to the fixed base, a moving mechanism portion, such as a robot arm coupled to the surface of the pivoting body, a motor for pivotably driving the pivoting body, and a speed reducer for transferring an output of the motor to the pivoting body; cables for supplying driving mechanism portion, such as a robot arm, with electric power or the like, are disposed through a protection pipe that passes through hollows of the motor and the speed reducer, by forming hollows along the center axes of the motor and the speed reducer and arranging the center axes coaxially with each other, and by arranging the center axes of the motor and the speed reducer coaxially with the pivotal center axis of the pivoting body.

In the pivoting apparatus of the industrial robot constituted as described above, by forming hollows along the center axes of the motor and the speed reducer and arranging the center axes coaxially with each other, by arranging the center axes of the motor and the speed reducer coaxially with the pivotal center axis of the pivoting body, and by disposing the cables so as to pass through the hollows of the motor and the speed reducer, the cables pass along the center axis of the pivoting body, thereby eliminating friction with the housing or the fixed base; therefore, breaking of wires due to wear and tear can be eliminated.

However, in the pivoting apparatus of the industrial robot described above, there has been a problem in that, with increased information and the like for driving and controlling the arm or the like, thereby upsizing the bundle of the cables, pivoting of the protection pipe along with the motor shaft could damage the coatings of the cables.

DISCLOSURE OF THE INVENTION

The present invention has been implemented in order to solve the foregoing issue; it is an object of the present invention to provide a pivoting apparatus, of an industrial robot, in which wear and tear on a cable due to pivotal driving in the joint of the robot is extremely unlikely to occur.

A pivoting apparatus according to the first embodiment of the present invention, of an industrial robot, including a fixed part, a pivoting part that pivots with respect to the fixed part, and a front end that operates through the pivoting part, is characterized by comprising:

a motor comprising a first shaft having a centrally penetrating first hollow portion;

a brake having a centrally penetrating second hollow portion for releasing and halting the motor, by making the first shaft be engaged with and fixed in the second hollow portion;

an encoder having a centrally penetrating third hollow portion for detecting a pivoting angle of the motor, by making the first shaft be engaged with and fixed in the third hollow portion;

a speed reducer having a second shaft having a centrally penetrating fourth hollow portion, for forming, by making the second shaft be coupled with and be communicated with the first shaft, a communicating hollow portion that is penetrated by the first and the fourth portions, and for reducing the rotation speed of the first shaft, the brake being coupled with and fixed in the pivoting part and the fixed part;

a first bearing including a first inner ring whose center is arranged coaxially with the communicating hollow portion, and including a first outer ring that is fixed to the fixed part;

a cylindrical pipe member whose one end is coupled to and fixed in the first inner ring, and the other end of which is coupled to and fixed in the pivoting part, the cylindrical pipe member being inserted with play into the communicating hollow portion and having a through-hole;

a cable whose one end is coupled to and fixed in the fixed part, and the other end of which is coupled to and fixed in the pivoting part and is inserted into the through-hole while being connected with the front end.

According to the pivoting apparatus of an industrial robot, the pipe member whose one end is coupled to and fixed to the fixed part, and the other end of which is coupled to and fixed to the pivoting part is inserted into the communicating hollow portion that is formed by arranging in a one line the motor, the speed reducer, the encoder, and the brake; the cable is wired through the through-hole of the pipe member.

In consequence, the wiring of the cable is not inhibited by the motor and the like, whereby the cable does not passes through waste wiring paths; therefore, the space for wiring is saved, and eventually, the pivoting apparatus is downsized. Moreover, because the pipe member merely pivots owing to the rotations of the fixed part and the pivoting part, the speed at which the pipe member contacts with the cable inserted into the pipe member is reduced significantly compared to the rotating speed of the motor. Therefore, an effect is demonstrated, in which the coating of the cable is extremely unlikely to undergo wear and tear.

The pivoting apparatus according to the second embodiment of the present invention, of an industrial robot, is characterized by comprising in place of the first bearing a second bearing that has a second inner ring whose center is arranged coaxially with the communicating hollow portion and has a second outer ring that is fixed to the pivoting part.

According to the pivoting apparatus of an industrial robot, because the second bearing is provided in the pivoting part, instead of providing the first bearing in the fixed part, an effect is demonstrated, in which the structure of the fixed part to be simplified.

The pivoting apparatus according to the third embodiment of the present invention, of an industrial robot, is characterized by comprising a driving unit in which the second shaft, the motor, the encoder, and the brake are integrated.

According to the pivoting apparatus of an industrial robot, an effect is demonstrated, in which assembling efficiency of the pivoting apparatus is enhanced.

The pivoting apparatus according to the fourth embodiment, of an industrial robot, is characterized by comprising a first clamper that is fixed to and coupled with the fixed part and that approximately horizontally fixes a fixed-side drawn-out portion of the cable that, through the through-hole, is drawn out on the fixed-part side, and a second clamper that approximately vertically fixes a pivoting-side drawn-out portion of the cable that, through the through-hole, is drawn out on the pivoting-part side.

According to the pivoting apparatus of an industrial robot, because the cable is appropriately fixed by means of the first and the second clampers, effects are demonstrated, in which the deterioration of the cable due to its movement is extremely reduced and the pivoting apparatus can further be downsized.

BEST MODE FOR CARRYING OUT THE INVENTION

Figure 1:
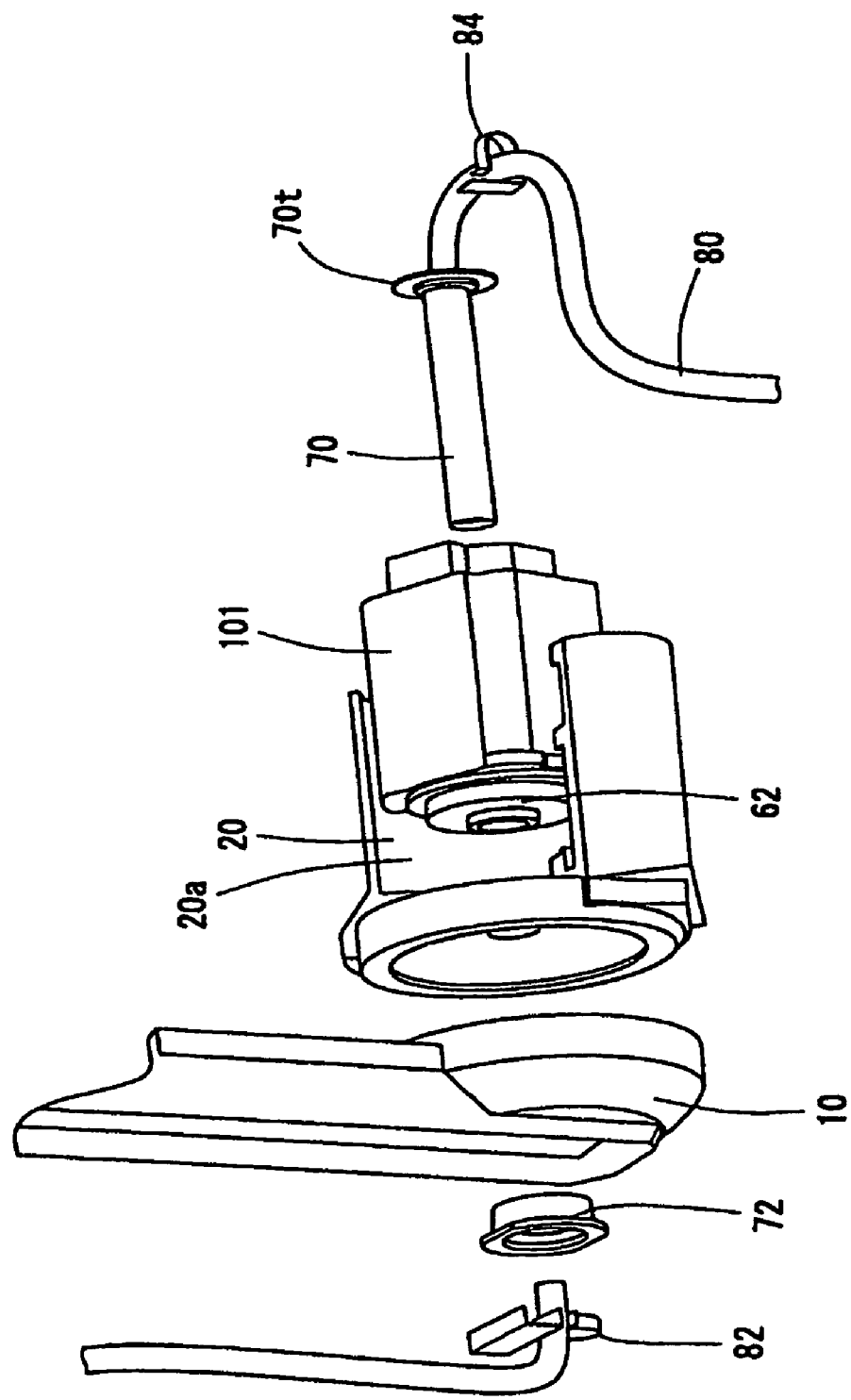
FIG. 1 is an exploded perspective view of a pivoting apparatus, of an industrial robot, according to one embodiment of the present invention.

Embodiment 1 of the present invention will be discussed referring to FIGS. 1 and 2. FIG. 1 is an exploded perspective view of a pivoting apparatus, of an industrial robot, according to Embodiment 1 of the present invention, and FIG. 2 is a transverse cross-sectional view of the pivoting apparatus of an industrial robot, illustrated in FIG. 1.

Figure 2:
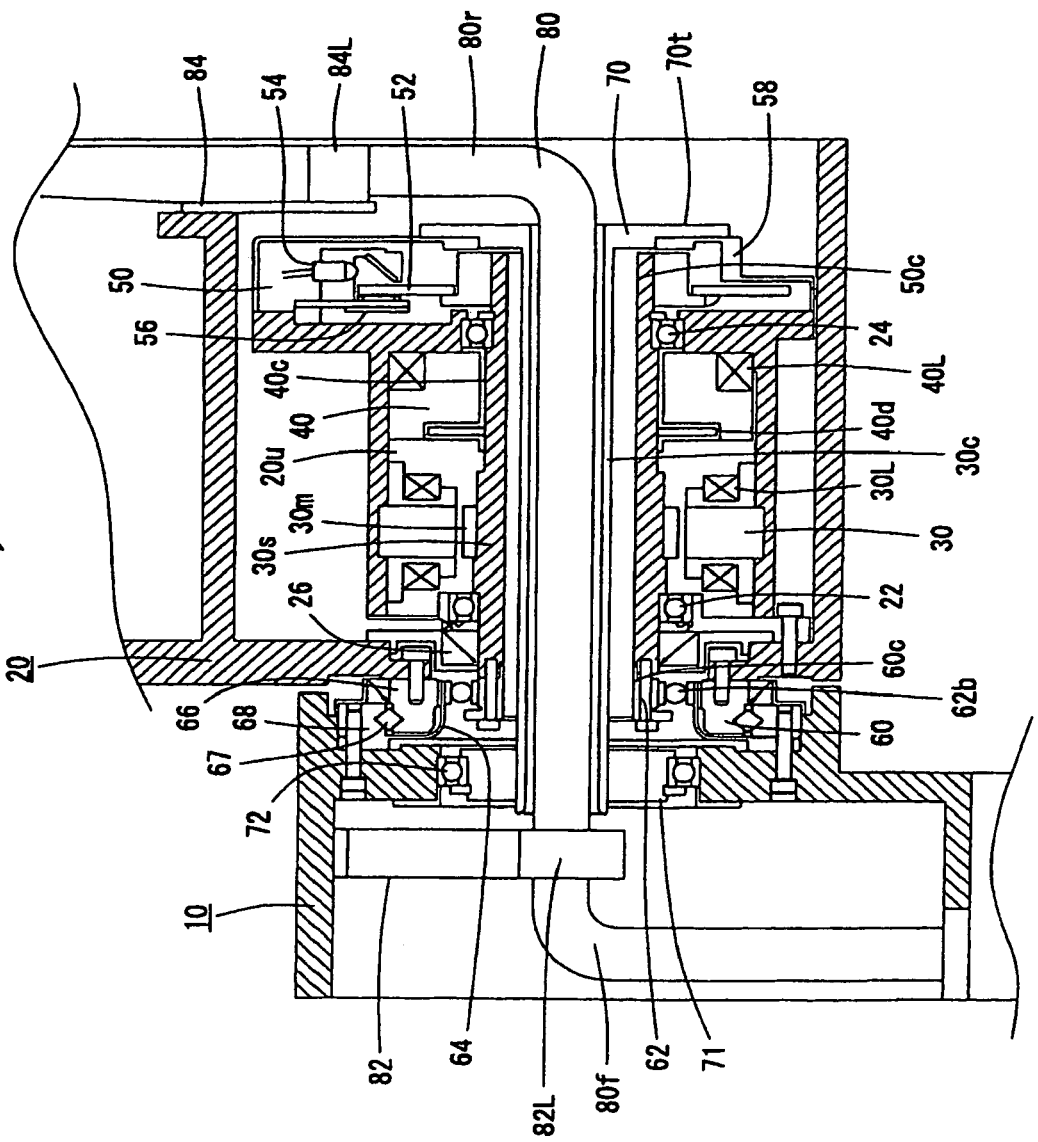
FIG. 2 is a transverse cross-sectional view of the pivoting apparatus of an industrial robot, illustrated in FIG. 1.

In FIGS. 1 and 2, the pivoting apparatus of an industrial robot includes a fixed-side arm 10 as a fixed part, and a pivoting-side arm 20, as a pivoting part, that pivots with respect to the fixed-side arm 10.

A hollow portion 20u having a roughly U-shaped cross-section exists inside the pivoting-side arm 20; inside the hollow portion 20u, as illustrated in FIG. 2, a break 40 and an encoder 50 are arranged and fixed on the right-hand side of a motor 30, and a speed reducer 60 is arranged and fixed on the left-hand side of the motor 30, in such a manner that they are all in one line and each of their center axes is situated horizontally.

On both ends of the hollow portion 20u, bearings 22 and 24 are fixed, respectively. In the center of the hollow portion 20u, the motor 30 is included that is a driving source for pivoting the pivoting-side arm 20 and has a motor shaft 30s, as a first shaft having a penetrating, column-shaped first hollow portion 30c formed along the center axis thereof, the motor 30 has ring-shaped coils 30L for generating a rotating magnetic field; and magnets 30m are fixed on the surface of the motor shaft 30s via cores.

The brake 40 that is arranged in the vicinity of the motor 30 and that has a penetrating, column-shaped second hollow portion 40c along the center axis thereof, for making the motor shaft 30s be engaged with and fixed to the second hollow portion 40c, and for releasing and stopping the pivotal movement of the motor 30; and the break 40 is formed in such a manner that the rotation of the motor 30 is stopped from being released by pressing one side of a circular disc 40d being released.

The encoder 50 is arranged in the vicinity of the brake 40 and that has a penetrating, column-shaped third hollow portion 50c along the center axis thereof, for fixing on the bearing 24 the motor shaft 30s protruding through the second hollow portion 40c, for making one end of the motor shaft 30s be engaged with and fixed to the third hollow portion 50c, and for detecting the pivoting angle of the motor 30; the encoder 50 includes a circular disc 52 having a pattern that is fixed on the motor shaft 30s, a light emitting element 54 for irradiating the pattern, a light-receiving element 56 for receiving via the circular disc 52 the light radiated by the light emitting element 54, and a cover 58 for covering the circular disc and the like.

A harmonic drive 60, as the speed reducer, is arranged in the vicinity of the motor 30 and is coupled with the motor shaft 30s, and that functions as a speed reducer for generating an output for reducing the rotation velocity of the motor 30 by pivoting a wave generator 62, as a second shaft, having a penetrating fourth hollow portion 60c along the center axis of thereof; the hollow portions 30c and 60c of the motor shaft and the wave generator 62, respectively, communicate to form a through-hole, thereby forming a communicating hollow portion.

The speed reducer 60 is, for example, a harmonic drive and is formed in such a way as to pivot the pivoting-side arm 20 with respect to the fixed-side arm 10, by coupling the hollow portion 60c of the hollow-shape wave generator 62 to the end of the motor shaft 30 s and fixing through flexible spline 64 the circular spline 66 on the pivoting-side arm 20, thereby sufficiently reducing the rotation velocity of the motor 30, for example, from 5000 (rpm) to 50 (rpm); the wave generator 62 has a great number of bearing balls 62b.

The speed reducer 60 is formed in such a way that a speed reducer bearing is configured from the circular spline 66 that corresponds to a inner ring, an outer ring 68, and a bearing 67 between the circular spline 66 and the outer ring 68, and that the pivoting-side arm 20 pivots with respect to the fixed-side arm 10, by coupling and fixing the pivoting-side arm to the circular spline 66, and by fixing the fixed-side arm 10 to the outer ring 68 of the speed reducer bearing.

In addition, a pipe-supporting bearing 72 as a first bearing has a first inner ring and a first outer ring; the center of the first inner ring is arranged coaxially with the communicating hollow portion; and the first outer ring is fixed to the fixed-side arm and the first inner ring is engaged with and fixed to a low-speed pivoting pipe 70 as a pipe member.

The low-speed pivoting pipe 70 is a cylindrical pipe with a through-hole, having a ring-shape collar portion 70t at one end thereof, is inserted with play into and passing through the motor shaft 30s and the wave generator 62, is fixed to the pivoting-side arm 20, with the collar portion 70t being fixed to the cover 58, and at the other end thereof is fixed to the fixed-side arm 10 through the ring 71 and the pipe-supporting bearing 72. Accordingly, the low-speed pivoting pipe 70 is formed in such a way as to rotate at the relative-displacement speed between the fixed-side arm 10 and the pivoting-side arm 20, i.e., at a speed that is obtained by sufficiently reducing the rotation velocity of the motor 30.

A cable 80 for sending power and a control signal to a front-end arm (unillustrated) as the front-end portion of the robot is inserted into the low-speed pivoting pipe 70, and the cable 80 is fixed to the pivoting-side arm 20 by means of a loop portion 84L of a pivoting-side clamper 84, by drawing out on the pivoting-side arm 20 a pivoting-side drawn-out portion 80r of the cable 80 through the low-speed pivoting pipe 70, and then by immediately wiring the pivoting-side drawn-out portion 80r vertically. The cable 80 is fixed to the fixed-side arm 10 by means of a fixed-side clamper 82 and is wired vertically, by wiring in a predetermined distance a fixed-side drawn-out portion 80f, of the cable 80, that is drawn out on the fixed-side arm 10 through the low-speed pivoting pipe 70, in parallel with the through-hole of the low-speed pivoting pipe 70. The fixed-side pulled-out portion 80f is wired in parallel with the low-speed pivoting pipe 70 and then is bent vertically, because the twist of the fixed-side pulled-out portion 80f with respect to the fixed pivoting-side drawn-out portion 80r, i.e., the relative displacement increases. On the contrary, the twist of the pivoting-side drawn-out portion 80r is little; therefore, the parallel wiring is not implemented, thereby reducing a space for wiring.

Next, the assembly of the industrial-robot pivoting apparatus configured as above will be described. Being arranged coaxially with others, the motor 30, the brake 40, the encoder 50, and the harmonic drive 60 form a driving unit 101 in which the wave generator 62 is coupled with the motor shaft 30s; the outer ring of the bearing of the harmonic drive 60 is mounted on the fixed-side arm 10, and the inner ring of the bearing of the harmonic drive 60 is mounted on the pivoting-side arm 20.

The pipe-supporting bearing 72 is fixed to the fixed-side arm 10 in such a way that the driving unit 101 of the fixed-side arm 10 is arranged coaxially with the pipe-supporting bearing 72, and the ring 71 is inserted into and fixed to the inner ring of the pipe-supporting bearing 72. The collar portion 70t of the low-speed pivoting pipe 70 is fixed to the cover 58 of the encoder 50, and the other end of the low-speed pivoting pipe 70 is inserted into and fixed to the ring 71.

The cable 80 is made to pass through the low-speed pivoting pipe 70; the fixed-side pulled-out portion 80f of the cable 80 is fixed in the loop portion 82L of the fixed-side clamper 82 as a first clamper, in such a way that the fixed-side pulled-out portion 80f is situated approximately in parallel with the through-hole of the low-speed pivoting pipe 70; the pivoting-side drawn-out portion 80r of the cable 80 is fixed in the loop portion 84L of the pivoting-side clamper 84 as a second clamper, in such a way that, after being drawn out through the low-speed pivoting pipe 70 and being wired horizontally in a short distance, the cable 80 is bent almost vertically.

Next, the operation of the industrial-robot pivoting apparatus configured as described above will be described. When a control command signal is inputted to the motor 30, the motor 30 rotates, thereby rotating the circular disk 52 that is coupled with the motor shaft 30s; then, by detecting through the encoder 50 the pivoting angle of the motor 30, a position detection signal is generated.

The wave generator 62 coupled with the motor shaft 30s, of the harmonic drive 60, pivots; through the flexible spline 64, the pivoting velocity of the motor 30 is sufficiently reduced by the circular spline 66; and the pivoting-side arm 20 is pivoted.

By such pivoting, the low-speed pivoting pipe 70 pivots due to the relative pivoting velocity between the fixed-side arm 10 and the pivoting-side arm 20; the fixed-side pulled-out portion 80f and the fixed-side pulled-out portion 80r, of the cable 80, move in such a way that the relative displacement of the fixed-side pulled-out portion 80f and the fixed-side pulled-out portion 80r are the largest, and the smallest, respectively. In addition, with the pivoting velocity of the motor 30 being sufficiently reduced by the harmonic drive 60, the low-speed pivoting pipe 70 pivots; therefore, the coating of the cable 80 inserted into the low-speed pivoting pipe 70 is satisfactorily protected.

Embodiment 2

Another embodiment of the present invention will be described, referring to FIG. 3.

Figure 3:
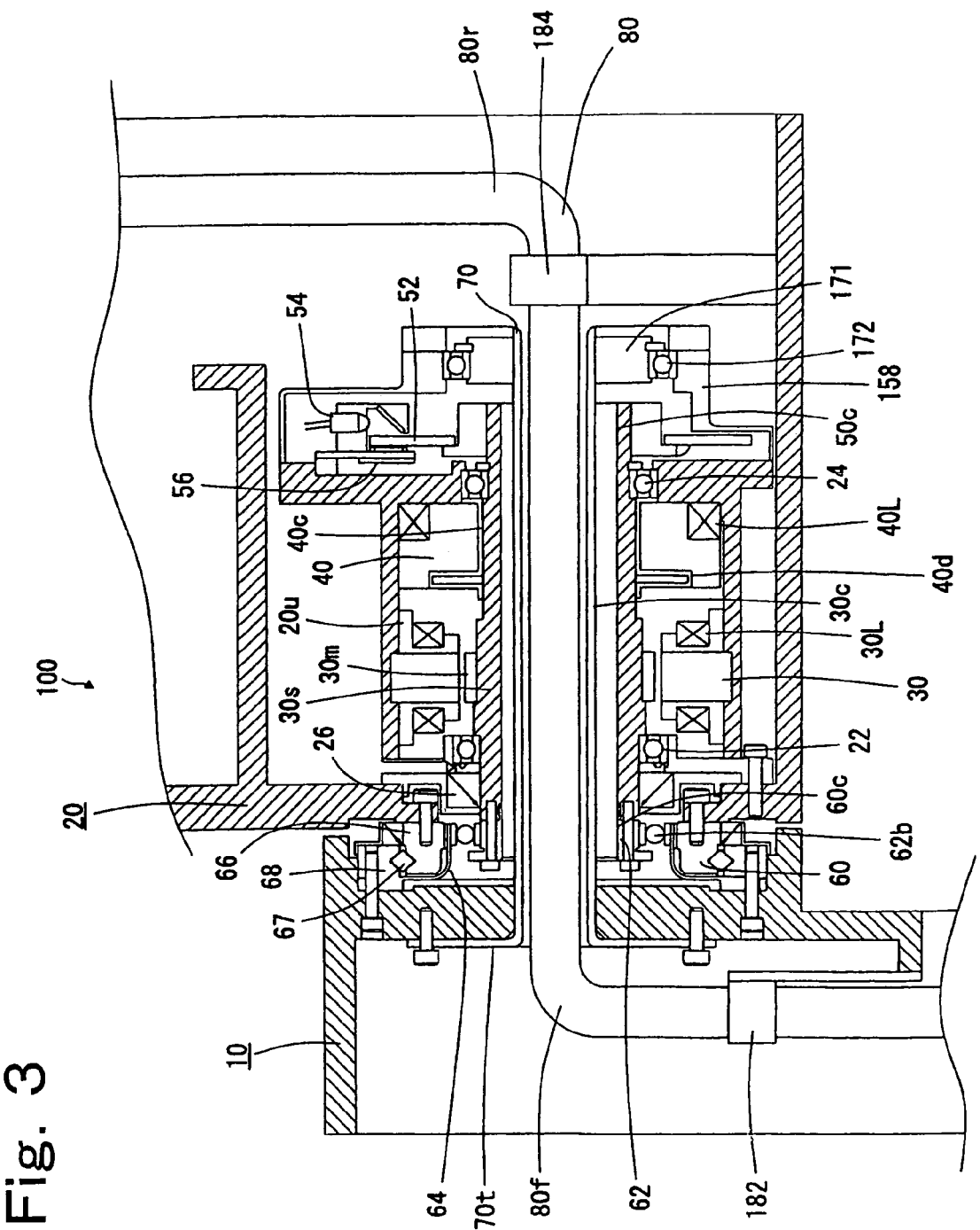
FIG. 3 is a transverse cross-sectional view of a pivoting apparatus, of an industrial robot, according to another embodiment of the present invention.

FIG. 3 is a transverse cross-sectional view of the pivoting apparatus of an industrial robot according to another embodiment. In FIG. 3, numerical references identical to those in FIG. 2 denote identical or corresponding parts, and the explanation therefor will be omitted.

In Embodiment 1, the one end of the low-speed pivoting pipe 70 is fixed to the fixed-side arm 10 through the ring 71 and the pipe-supporting bearing 72, and the other end (the collar portion 70t) of the low-speed pivoting pipe 70 is coupled with and fixed to the pivoting-side arm 20, by being fixed to the cover 58.

However, in a pivoting apparatus 100 of the industrial robot according to Embodiment 2, contrary to Embodiment 1, as illustrated in FIG. 3, the one end of the low-speed pivoting pipe 70 is fixed to a cover 158, through a ring 171 and a bearing 172 as a second bearing, and the other end (the collar portion 70t) of the low-speed pivoting pipe 70 is fixed to the fixed-side arm 10.

The one end of the cable 80 is fixed to the pivoting-side clamper 20 by means of a clamper 184, and the other end of the cable 80 is fixed to the fixed-side arm 10, through a fixed-side clamper 182.

In other words, the cable 80 is made to pass through the low-speed pivoting pipe 70; the pivoting-side drawn-out portion 80r being drawn out through the low-speed pivoting pipe 70 is wired in such a way as to be situated approximately in parallel with the through-hole of the low-speed pivoting pipe 70 and is fixed to the pivoting-side arm 20 by means of the pivoting-side clamper 184; after being wired horizontally in a short distance, the fixed-side drawn-out portion 80f is fixed in the fixed-side clamper 182, in such a way as to be bent almost vertically. The pivoting apparatus pivots through the relative pivoting velocity between the fixed-side arm 10 and the pivoting-side arm 20, and the twists of the pivoting-side drawn-out portion 80r, i.e., the relative displacement is the largest and the twist of the fixed-side drawn-out portion 80f is the smallest; therefore, the fixed-side drawn-out portion 80f is wired not horizontally but vertically, whereby a space for wiring is reduced.

According to Embodiment 2, as is the case with Embodiment 1, because the low-speed pivoting pipe 70 pivots, with the pivoting velocity of the motor 30 being sufficiently reduced by the harmonic drive 60, the coating of the cable 80 inserted into the low-speed pivoting pipe 70 is satisfactorily protected.

INDUSTRIAL APPLICABILITY

As described heretofore, the pivoting apparatus, of an industrial robot, according to the present invention is suitable to wire cables in a jointed structure.

What is claimed is:

1. A pivoting apparatus, of an industrial robot, including a fixed part, a pivoting part that pivots with respect to the fixed part, and a front end that operates through the pivoting part, the pivoting apparatus comprising:

a motor comprising a first shaft having a centrally penetrating first hollow portion;

a brake having a centrally penetrated second hollow portion, for releasing and halting the motor, by making the first shaft be engaged with and fixed to the second hollow portion;

an encoder having a centrally penetrating third hollow portion, for detecting a pivoting angle of the motor, by making the first shaft be engaged with and fixed to the third hollow portion;

a speed reducer comprising a second shaft having a centrally penetrating fourth hollow portion, for forming, by making the second shaft be coupled with and fixed to the first shaft, a communicating hollow portion that is penetrated by the first and the fourth hollow portions, and for reducing the rotating speed of the first shaft, the brake being coupled with and fixed in the pivoting part and the fixed part;

a first bearing including a second inner ring whose center is arranged coaxially with the communicating hollow portion, and including a second outer ring that is fixed to the pivoting part;

a cylindrical pipe member whose one end is coupled to and fixed in the second inner ring, and the other end of which is coupled to and fixed in the fixed part, the cylindrical pipe member being inserted with play into the communicating hollow portion and having a through hole;

a cable whose one end is coupled to and fixed in the fixed part, and the other end of which is coupled to and fixed in the pivoting part and is inserted into the penetrated hollow while being connected with the front end.

2. The pivoting apparatus of an industrial robot, according to claim 1, comprising a first clamper that is fixed to and coupled with the fixed part and that approximately horizontally fixes a fixed side drawn out portion of the cable that, through the through hole, is drawn out on the fixed part side, and a second clamper that approximately vertically fixes a pivoting side drawn out portion of the cable that, through the through hole, is drawn out on the pivoting part side.

* * * * *